Feb. 18, 1936.   J. F. OHMER   2,031,060
PRINTING ODOMETER
Filed Oct. 3, 1932    4 Sheets-Sheet 3
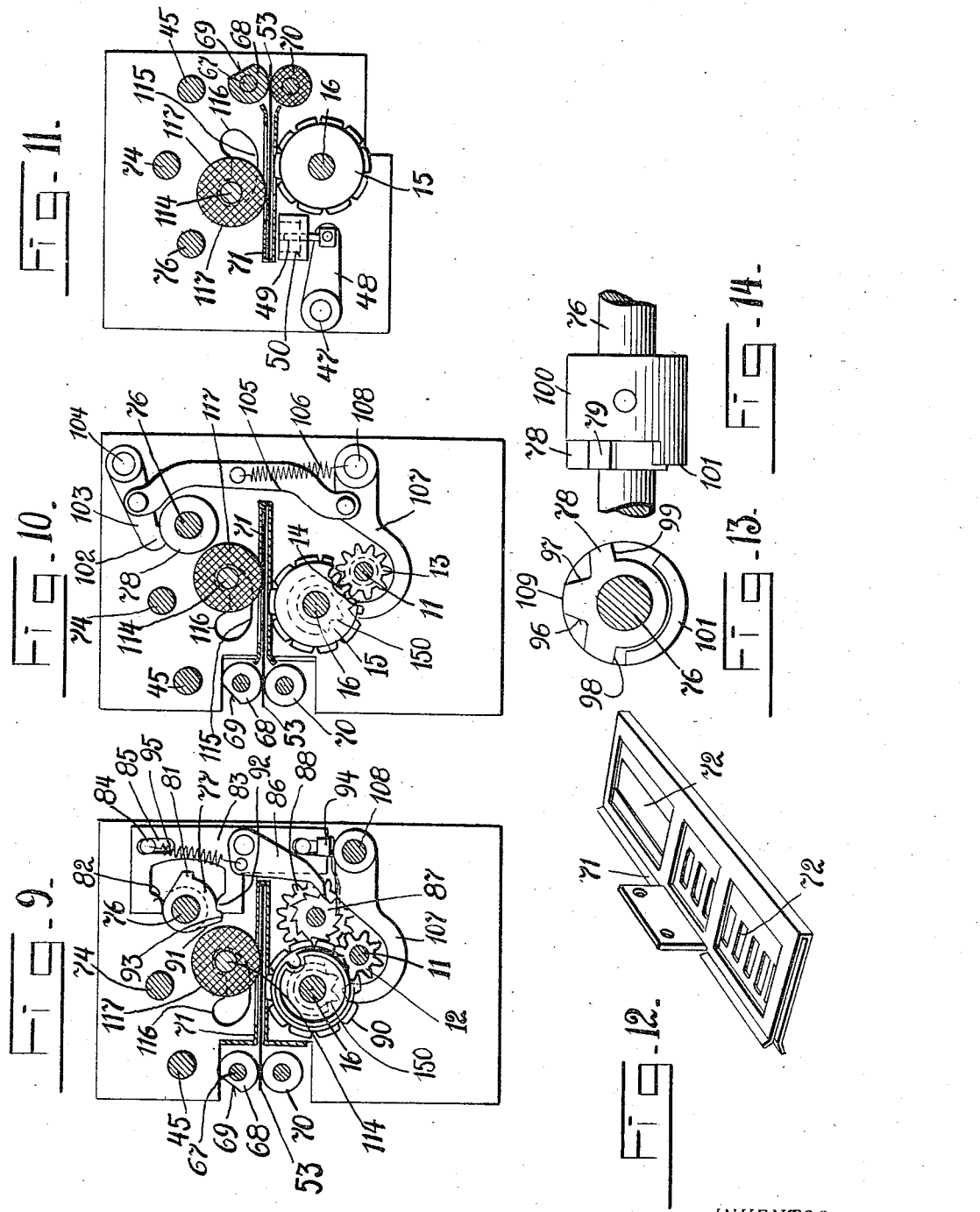
INVENTOR
John F. Ohmer
BY Hastings W. Baker
ATTORNEY

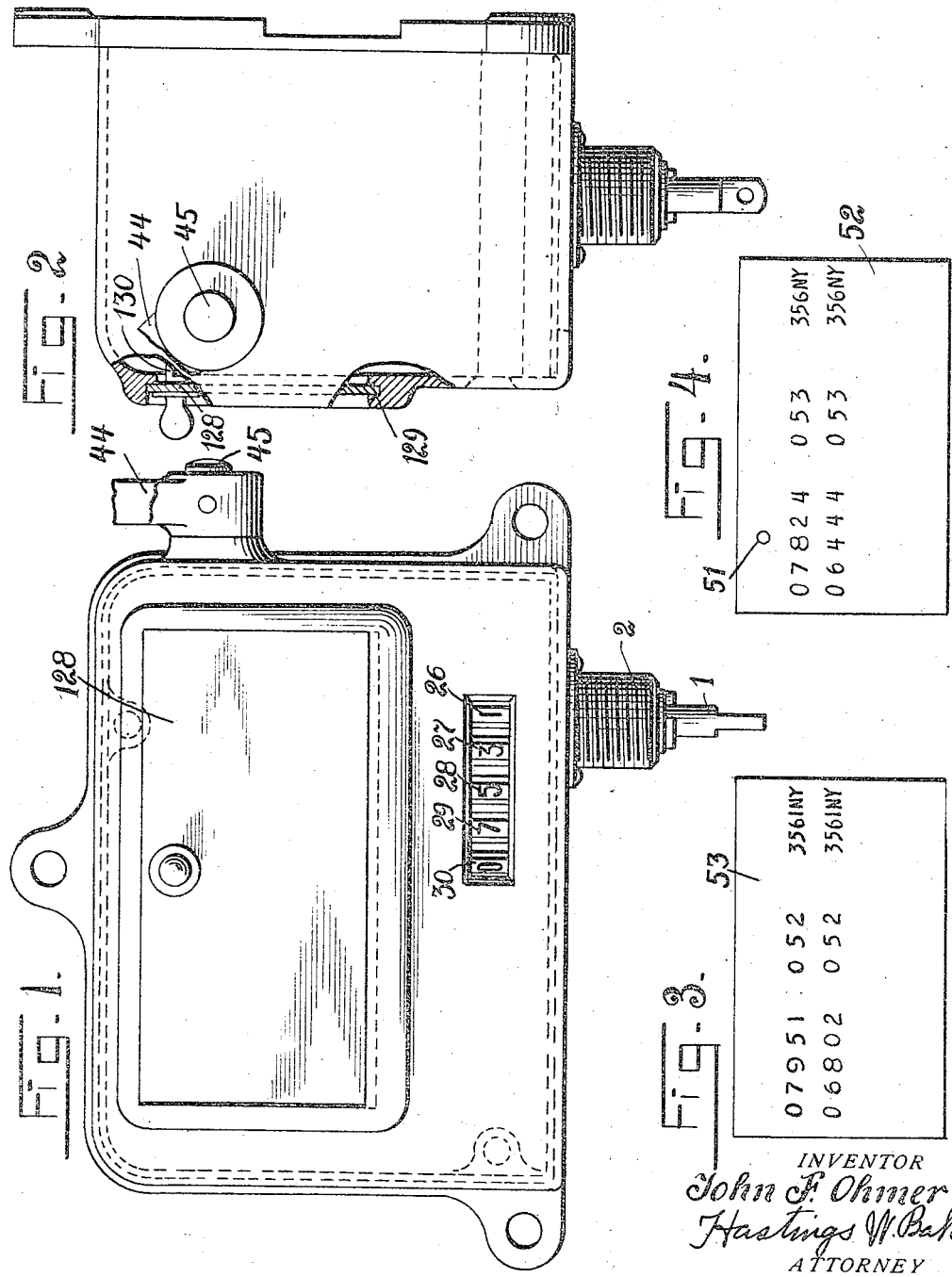

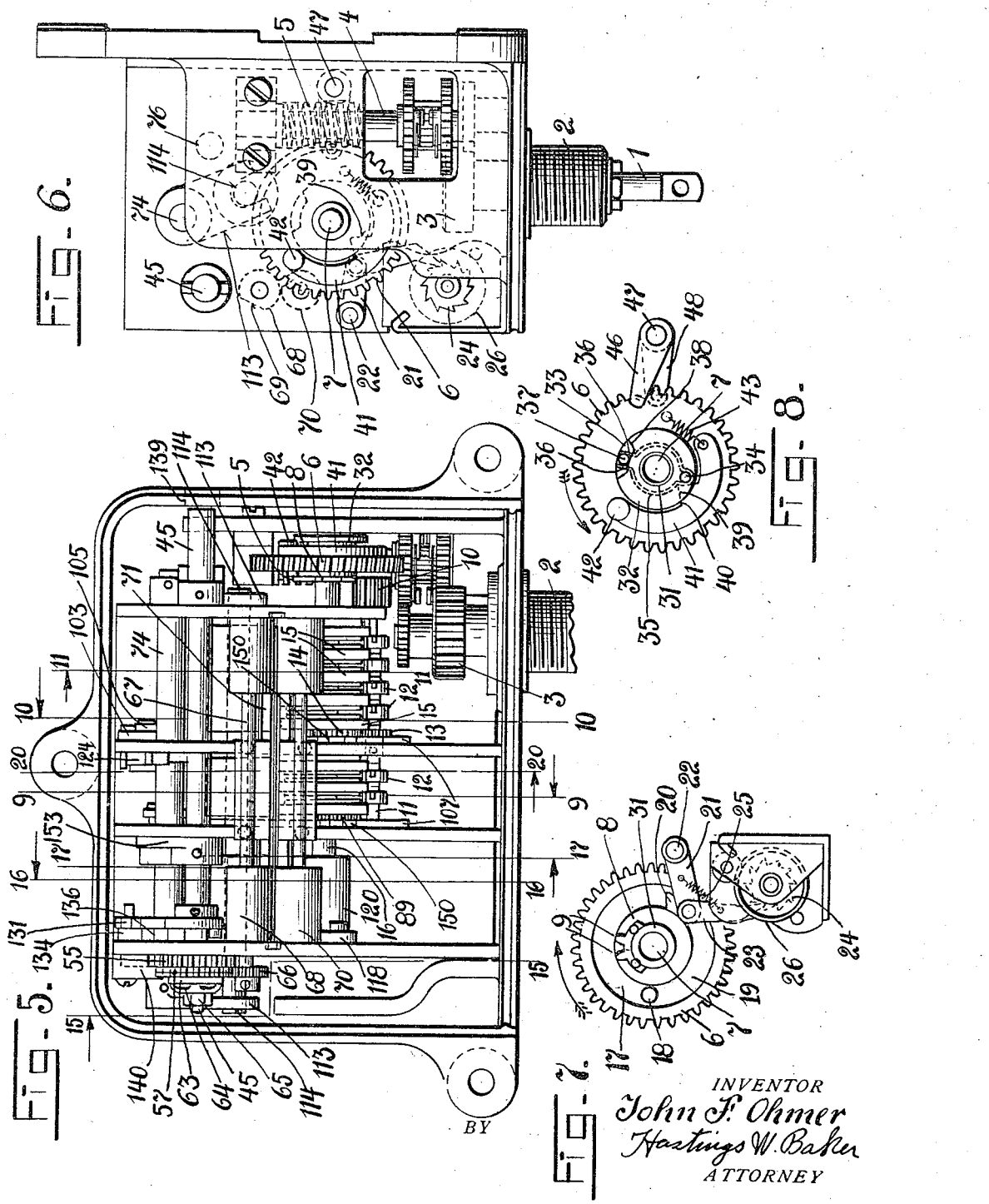

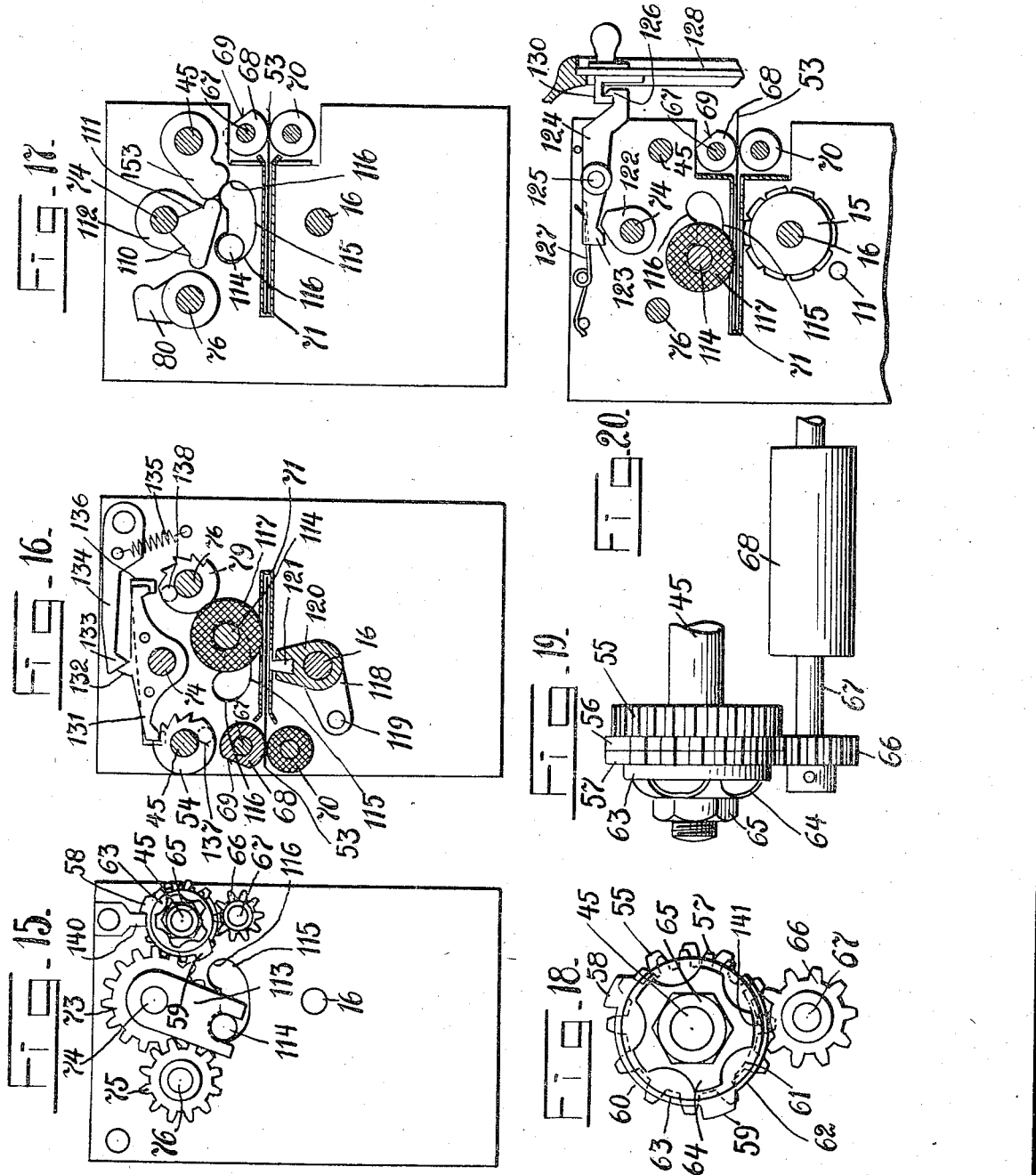

Patented Feb. 18, 1936

2,031,060

UNITED STATES PATENT OFFICE 2,031,060

PRINTING ODOMETER

John F. Ohmer, Dayton, Ohio, assignor, by mesne assignments, to Central United National Bank, Cleveland, Ohio, as trustee Application October 3, 1932, Serial No. 635,976

11 Claims. (Cl. 101—66)

This invention relates to a printing odometer and is peculiarly adapted for use in connection with trucks and other vehicles against which a tax is assessed on the basis of the number of miles traveled. For instance, if a State has a law taxing trucks or other vehicles on the basis of mileage traveled, it is necessary for this mileage to be accurately recorded. Of course, the State could provide auditors who would periodically inspect every truck in the State and read from a visual odometer the present mileage, from which mileage they would subtract the mileage recorded at the time of the last inspection which would give the mileage traveled during the interim and on which the tax would be predicated but it is manifest that such a procedure would be quite expensive. I have, therefore, provided a printing odometer on which a ticket or card board may be inserted and an opening impression made thereon showing the mileage which the vehicle had traveled up to the time said impression was made. I have also provided means to lock this card board within the odometer until a closing impression is made. The difference between the mileage readings of the opening and closing impressions represents the number of miles that the vehicle has traveled during the interim. On this ticket or card board would also be impressed the consecutive number showing the number of tickets or card boards which had been so inserted and to this end, of course the consecutive number printed on the opening impression would be the same as the consecutive number printed on the closing impression. I also print the machine number and the State on both the opening and closing impressions. These tickets or card boards are then forwarded by the operator to the taxing authorities. If the vehicle were driven without a piece of card board being inserted, the opening registration after the next card is inserted would not correspond with the closing mileage record of the last card board inserted and this deception would, therefore, be manifest to the auditing department. On the other hand, if the operator inserted a card and took the opening and closing impressions and if he then threw that card away and inserted another card which he later sends to the auditing department of the taxing authorities, this deception would likewise be manifest for the card sent in would not have the succeeding consecutive number to that appearing on the card last sent in. The auditing department of the taxing authorities would have to maintain records of every truck in the State from these cards sent in and the tax would be based on the mileage revealed by these cards.

I realize that some fraudulently inclined person might be inclined to attempt to remove one of the cards after it had been inserted. To this end, I lock the card within the machine until the closing impression has been made. I have also provided a door which is locked at the time that the opening impression is made and remains locked and cannot be unlocked until the closing impression is made, at which time the said door is automatically unlocked.

I also realize that a fraudulently inclined person might attempt to render the printing odometer inoperative by partly taking a printing impression and leaving the type wheels in contact with the card board and thereby locking them against rotation. To render this deception manifest I have provided means which will mark on the card board an indication of this fact and I have also provided a visual counter which will continue to be operated if the vehicle is driven even if the printing wheels are locked against operation by the impression being partly taken. When this card board is sent in to the taxing authorities they will be advised by the tell-tale mark on the card that the operator has attempted to defraud the taxing authorities. In this case it will be necessary to compare the visual counter with the printing counter and the difference between the mileage recorded thereon will represent the number of miles that the vehicle was driven while the printing wheels were locked against operation by a printing impression being partly taken.

Other objects and advantages will appear in the detailed specification and claims which follow.

In the drawings:

Fig. 1 is a front elevational view of the printing odometer;

Fig. 2 is a side elevational view;

Fig. 3 is a view of one of the tickets or card boards on which the opening and closing impressions have been made;

Fig. 4 is a view similar to that in Fig. 3 except that the tell-tale mark is shown thereon, showing that the machine has been operated while the printing wheels were locked against operation.

Fig. 5 is a front elevational view of the machine with the front cover removed;

Fig. 6 is a view similar to Fig. 2 but with the cover removed;

Fig. 7 is an elevational view of the visual counter operating means;

Fig. 8 is an elevational view of a portion of the operating means for the tell-tale device;

Fig. 9 is an elevational view partly in cross section taken on the line 9—9 of Fig. 5;

Fig. 10 is an elevational view partly in cross section taken on the line 10—10 of Fig. 5;

Fig. 11 is an elevational view partly in cross section taken on the line 11—11 of Fig. 5;

Fig. 12 is a perspective view of the card holding means;

Fig. 13 is a side elevational view partly in cross section of the means to operate the aligning mechanism;

Fig. 14 is a side elevational view of the mechanism shown in Fig. 13;

Fig. 15 is a side elevational view on the line 15—15 of Fig. 5;

Fig. 16 is a side elevational view partly in cross section on the line 16—16 of Fig. 5;

Fig. 17 is an elevational view partly in cross section on the line 17—17 of Fig. 5;

Fig. 18 is an enlarged view of the mechanism shown in the right hand upper corner of Fig. 15;

Fig. 19 is a side elevational view of the mechanism shown in Fig. 18; and

Fig. 20 is an elevational view partly in cross section on the line 20—20 of Fig. 5.

Referring to the drawings in detail, a shaft 1 is driven from any suitable part of the vehicle such as the transmission shaft, it being connected therewith by the conventional flexible shaft. The shaft 1 is journaled in a housing 2 and carries at the upper end thereof a gear 3. Regardless of the direction of rotation of the gear 3 the shaft 4 is driven thereby in one direction only so that the shaft 4 is driven in one direction regardless of whether the vehicle is driven forwards or backwards. This method of converting forward or backward rotation into uniform rotations is well known in the art and requires no detailed description thereof. The shaft 4 is provided with a worm 5 which meshes with and drives a gear 6. The gear 6 is loosely mounted on a collar 31, which in turn is loosely mounted on the shaft 7. Secured to the collar 31 is a disk 8. Secured to the disk 8 are two teeth 9 which are brought into engagement with a gear 10 each time the gear 6 makes one complete revolution, thereby rotating the gear 10 one tooth for each complete revolution of the gear 6. The gear 10 is secured to a shaft 11 (Figs. 5 and 9) on which are loosely mounted a number of Geneva pinions 12. Also secured to the shaft 11 is a spur pinion 13 (Figs. 5 and 10) which meshes with and drives a gear 14 secured to a units printing wheel 15. To the right of the units printing wheel 15, as viewed in Fig. 5, are tens, hundreds, thousands and tens of thousands printing wheels, which are driven by conventional Geneva gearing, of which the Geneva pinions 12 form a part, which structure is well known in the art and requires no detailed description. It will, of course, be understood that the gear reduction would be such that the units printing wheel 15 would be driven one-tenth of a revolution for each mile or other unit of distance traveled. All of the mileage printing wheels are mounted on a shaft 16.

The gear 6 is provided with a web 17 as shown in Fig. 7 which carries a pin 18 which pin 18 is in a channel 19 formed by the inner periphery of the gear 6 and the outer periphery of the disk 8. As the gear 6 is rotated in the direction of the arrow shown in Fig. 7 it engages a block 20 carried by the upper portion of a lever 21 pivoted to a shaft 22, thereby depressing the lever 21 to which is pivoted a pawl 23 which is pulled into engagement with a ratchet 24 by means of a spring 25. A units counting wheel 26 is secured to the ratchet 24. The tens counting wheel 27, hundreds wheel 28, thousands wheel 29 and tens of thousands wheel 30 are driven from the units wheel by Geneva gearing, which requires no description. The spring 25 not only pulls the pawl 23 into engagement with its ratchet but after the pin 18 has passed beyond its engagement with the lever 21 the spring 25 cams the lever 21 upwardly so as to again be in a position to be engaged by the pin 18 on the next revolution thereof.

It may be that the operator might, with intention to commit fraud, hold the printing wheels against operation as, for instance, by partly operating the printing mechanism hereinafter to be described. I have, therefore, provided means whereby the machine will not be damaged in case the printing wheels are held against rotation. To this end I have loosely mounted the gear 6 and web 17 on the collar 31 to which, it will be remembered, is attached the disk 8. On the other side of the gear 6, as shown in Fig. 8, and integral with the collar 31 is a disk 32 which is spaced from the gear 6 by means of a disk 33 which is loosely mounted on the collar 31. The disk 32 is provided with a pin 34 around which passes a spring 35, terminating in two arms 36 which engage a pin 37 carried by the disk 33. The disk 32 is cut away adjacent the pin 37, which cut away portions terminate in surfaces 38. The spring, therefore, tends to hold the disks 32 and 33 in the position relative to each other as shown in Fig. 8 but if one of these disks should be rotated relative to the other there would be an amount of free play until the pin 37 contacts one of the surfaces 38, at which time continued rotation of one of the disks would impart its rotation to the other of said disks. The inner disk 33 has a V-shaped notch 39 therein which is normally engaged by a tooth 40 of a lever 41 pivoted on a pin 42 carried by the gear 6. This lever is pulled inwardly by means of a spring 43. Unless the printing mileage wheels are obstructed the gear 6, when rotated, will, through the lever 41, disk 33, spring 36, disk 32, collar 31, disk 8, teeth 9, and gear 10, drive the printing mileage wheels but if the printing mileage wheels, together with gear 10, is held against rotation the collar 31 and disks 32 and 33 will correspondingly be held against rotation, or at least they will be as soon as the teeth 9 engage the gear 10. In this case, the gear 6 would continue its rotation and the tooth 40 would be cammed out of the V-shaped notch 39 in the disk 33 so that the tooth 40 would thereafter ride on the periphery of the disk 33.

Particular attention, however, is called to the fact that even if the mileage printing wheel should be held against rotation the gear 6, which might be called the driving gear, will continue its rotation and the stopping of the mileage printing wheels will in nowise affect the operation of the visual counter shown in Fig. 7. There is, therefore, the driving gear 6 which is rotated in one direction whenever the vehicle moves regardless of whether that vehicle moves forwardly or backwardly. This driving gear 6 drives printing wheels and also drives a visual counter but the driving means whereby the printing wheels are driven from the driving gear 6 are separate and distinct from the means whereby the visual counter is driven from said driving gear, to the end that if the printing wheels are held against rotation the visual counter will be actuated in its regular manner. In case the mileage printing wheels are held against rotation and the tooth 40 is cammed out of the V-shaped notch 39, thereby moving the lever 41 outwardly on its pivot 42, the said lever 41 will engage an arm 46 secured to a shaft 47 (Figs. 8 and 11) to which is secured an arm 48, thereby raising the arm 48 to which is attached a stylus 49 which is moved upwardly through an ink pad 50 so as to place a mark 51 (Fig. 4) on the under side of a ticket or card board 52. This mark, therefore, shows to anyone looking at the card board that the machine has been operated while the mileage printing wheels were held against rotation.

As shown in Fig. 1, I have provided a hand crank 44 which normally extends downwardly for approximately 128 degrees from the position shown in Fig. 1. By normally I mean before the ticket has been inserted in the machine. This hand crank is detachably secured to a shaft 45 such as by a tongue and groove connection shown in Figs. 5 and 6. On this shaft 45 is a cam 53 (Figs. 5 and 17), a full stroke ratchet 54 (Figs. 5 and 16), and a spur gear 55 (Figs. 5, 18 and 19), all of which are secured to said shaft 45, while loosely mounted on the said shaft are mutilated gears 56 and 57, which mutilated gears are pinned together. Each of the mutilated gears 56 and 57 are provided with teeth for a portion of their circumference and with stops 58 and 59. They are each provided with an arcuate surface 60 for their minor arcs extending between the said stops. The only difference between the mutilated gears 56 and 57 is that the mutilated gear 57 has a cut-away portion 61 forming an arc of minor radius extending between the lowermost portion of the stop 59, as viewed in Fig. 18, and the teeth, whereas the mutilated gear 56 is provided with an arcuate surface 62 having the same radius as the arcuate surface 60. Secured to the shaft 45 and outwardly of the mutilated gear 57 is a friction disk 63 which is pressed against the gear 57 by means of a spring 64, the tension of which may be adjusted by means of a nut 65. When the handle 44 is in its down position the stop 59 (Figs. 18 and 19) is against a fixed stop 140. The teeth of the mutilated gears 56 and 57 are in mesh with a pinion 66 which is secured to a shaft 67 to which is attached a feed roll 68 provided with a chord 69. One-half of the width of one tooth of the gear 66 is cut away, leaving a half tooth 141 which enters the cut-away portion adjacent the arcuate surface 62 while the two adjacent teeth engage the greater arcuate surface 62, thereby locking the disk 66 against rotation after it has rotated the required amount to feed the ticket into the machine. The chord surface of the feed roll 68 is directly parallel to the planes in which the ticket shown in Figs. 16 and 17 is inserted so that the feed roll 68 presents no obstruction to the insertion of the ticket between the feed roll 68 and a lower feed roll 70. When the handle is moved from its lowermost position to its uppermost position the teeth on the mutilated gears 56 and 57 rotate the pinion 66 and feed rolls 68 so that the feed roll 68 engages the ticket or card board 52 and draws it into the holder 71 which is provided with slots 72 in its lowermost surface directly above the printing wheels. While the ticket is being moved into its innermost position by the said feed rolls, the stop 59 has been rotated away from the stop 140 and as soon as the ticket has been fully drawn into the machine as above described the stop 58 will be brought into contact with the fixed stop 140, thereby stopping the rotation of the mutilated gears 56 and 57 and hence stopping the feeding of the card board so that the card board is now in its fully inserted position and is held stationary while the handle 44 is still being moved upwardly.

The gear 55 always meshes with a gear 73 loosely mounted on a shaft 74, which gear 73 meshes with and drives a gear 75 secured to a shaft 76 which likewise has secured thereto a consecutive number cam 77 (Fig. 9), a liner cam 78 (Fig. 10), a full trip and stop ratchet 79 (Fig. 16), and a printer cam 80 (Fig. 17).

When the handle is down and the ticket is inserted, the first thing that occurs as we move the handle up is to draw the ticket in as heretofore described. While the ticket, however, is being pulled inwardly the consecutive number cam 77 is being rotated from a position in which its nose 81 is directly beneath the nose 82 of a slide 83 guided by means of a pin 84 extending through a slot 85 in the said slide. Secured to the slide 83 is a pawl 86 which engages, when depressed, a ratchet 87 secured to a gear 88 which meshes with and drives a gear 89 (Fig. 5) secured to the units wheel of a consecutive number printer 90. The units wheel of the consecutive number mechanism is connected to the tens and hundreds printing wheel of the consecutive number mechanism by means of Geneva gearing. As soon as the operator starts to move the crank handle upwardly, removing the nose 81 of the cam 77 out of engagement with the nose 82, the cam surface 91 of the said consecutive number cam 77 engages a nose 92 of the slide 83 and moves the said slide downwardly until the nose 93 of the said cam passes the nose 92 of the slide so that the slide is moved downwardly, the lower end of which is guided by a fixed stud 94 so that the ratchet 87 and units wheel of the consecutive counter are operated one space. As soon as the nose 93 passes beyond the nose 92 a spring 95 slightly raises the slide and the pawl 86 so that the liner mechanism hereinafter to be described can correctly position the type wheels forming the consecutive counter. It is, therefore, apparent that the first two things that occur are that the ticket is drawn into the machine and the consecutive counter is operated.

Referring to Figs. 10, 13 and 14, the liner cam 78 is loosely mounted on the shaft 76 and is provided with two V-shaped cut-away portions 96 and 97 and with stops 98 and 99. Secured to the shaft 76 is a disk 100 provided with a circular flange 101 which over-laps a portion of the cam 78 and is adapted to engage the stops 98 and 99. When the handle is in its down position the right hand end of the flange 101, as viewed in Fig. 13, is approximately 54 degrees from the stop 99 so that as the shaft 76 is rotated anticlockwise, as viewed in Fig. 13, while the handle is being raised, no movement would be imparted to the cam 78 until the said shaft 76 has rotated approximately 54 degrees and during which time the ticket has been drawn into the machine and the consecutive number mechanism has been actuated. During this time the nose 102 of the lever 103 is raising in the V-shaped cutaway portion 97. The lever 103 is pivoted on a shaft 104 and between the pivot point and the nose 102 a link 105 is pivoted to the said lever, which link is normally pulled down by means of a spring 106. The lower end of the link 105 is pivoted to a liner lever 107 pivoted on a shaft 108. The left hand end of the lever 107, as viewed in Figs. 9 and 10, is raised so as to engage between the teeth of the star gears 150 when the nose 102 is raised out of the V-shaped cut-away portion 97 and onto the arcuate surface 109 thereby lining up all the printing wheels, there being one such star gear 150 for each of the units printing wheels of the consecutive number and the mileage wheels.

The crank shaft 45 is provided as heretofore described with a cam 153 (Fig. 17) and the shaft 76 is provided with a cam 80. The position of these cams when the handle is down is approximately 128 degrees from the position shown in Fig. 17. As the handle is being moved upwardly both of these cams are rotated anti-clockwise, the cam 80 being rotated away from a cam surface 110 and the cam 153 being rotated towards a cam surface 111, both of which cam surfaces form a part of a lever 112 secured to the shaft 74, thereby rotating the said shaft to which is secured arms 113 on opposite sides of the machine, which arms are bifurcated at their lower ends and receive a printing shaft 114 which passes through and is guided by arcuate cut-away portions 115 in the frame of the machine, which cut-away portions have upturned extensions 116. When the handle is down the shaft 114 is in the right hand upturned extension 116 as viewed in Figs. 15 and 17 and in the left hand one, as viewed in Fig. 16. When the cam 80 is freed from the cam surface 110 and the cam 153 engages the cam surface 111 thereby rocking the shaft 74 and arms 113 the printing shaft 114 is moved out of the said upturned extension and is cammed downwardly by the sides thereof so as to depress the shaft 114 which carries a platen 117 which engages the upper end of the ticket which has been inserted and drawn into the machine as hereinbefore described and presses it against the type wheels, thereby taking a printing impression on the ticket. The continued upward movement of the handle moves the shaft 114 into the opposite extension 116 or into the position shown in Figs. 15, 16 and 17.

An arm 118 is secured to a shaft 16 and on a pin 119 and secured to this arm is an extension 120 which carries printing type 121, which type is the type used to print the machine number and the State, such as shown in Figs. 3 and 4.

When the handle is in its upward position and the ticket has been drawn into the machine, the type wheels aligned and the printing impression made, a fraudulently inclined person might attempt to remove the ticket, whereas it should remain locked in the machine until the closing impression has been made. It is true that the feed rollers 69 and 70 hold the ticket within the machine so that only its extreme end would be accessible but I desired to provide means so as to render inaccessible the ticket until the closing impression had been made and to this end I have provided on the shaft 74 a cam 122 which normally lies immediately beneath a nose 123 of a lever 124 pivoted on a pin 125 and provided at its outer end with a locking lug 126. When the handle is down the cam 122 lying beneath the nose 123 holds the left hand end of the lever 124 upwardly against the tension of a spring 127 and holds the right hand end of the lever depressed so that the door 128 may be inserted into a lower channel 129 (Fig. 2). The said door is provided with an overturned flange 130 which when the handle is raised, moving the cam 122 clockwise, as viewed in Fig. 20, and away from the nose 123, the spring 127 will depress the left hand end of the lever 124, as viewed in Fig. 20, and will elevate the locking lug 126 into engagement with the flange 130, thereby locking the door against being moved outwardly. It cannot be moved downwardly, upwardly, or to the right or left on account of the fact that the door is seated in a depression in the frame, as shown in Fig. 2. The door, therefore, cannot be moved at all as long as the handle is in any position other than its down position.

I have further provided a full stroke mechanism, best shown in Fig. 16, to which I have attached the ratchets 54 and 79 to the shafts 45 and 76 respectively. One or the other of these ratchets engages a lever 131 pivoted on the shaft 74 and having a nose 132 which is provided on each side thereof with cam surfaces to be engaged by a V-shaped nose 133 of a lever 134 which is pulled downwardly by means of a spring 135. Pinned to the lever 131 is a lever 136 which is adapted to be engaged by pins 137 or 138 carried by the ratchets 54 and 79 respectively. When the handle is in its down position the lever 131 is in engagement with the teeth of the ratchet 79 so that the handle can only be moved upwardly. As soon as it has been moved upwardly, however, the pin 138 engages the right hand end of the lever 136 and trips the lever 131 into the position shown in Fig. 16 and the lever 134 holds the said lever in that position so that the left hand end of the lever 131 is now in engagement with the ratchet 54, thereby stopping the upward movement of the lever. The cam 79 has, while the handle is being raised, prevented the handle being lowered on account of the teeth thereof engaging the right hand end of the lever 131. It is, therefore, apparent that I have provided mechanism which when the handle is being raised will draw the ticket into the machine, align the type wheels, lock the door, and print the opening impression on the ticket and that I have also provided means to prevent the handle being lowered until it has been fully raised. In all of the views in the drawings the parts are shown in the position which they would occupy when the handle is raised with the ticket in the machine and the opening impression having been made. The nose 102 of the liner lever is now resting in the V-shaped cut-away portion 96 so that the lever 107 is not engaging the type wheels and the machine can now be operated so that the mileage printing wheels and the visual counter will be operated.

When it is desired to take a closing impression at the end of a month or any other period of time, the operator should re-insert the handle and should move it from its up position to its lowermost position. During the time that the machine is being driven the handle should be removed and preferably a seal 139 should be inserted so that the handle could not be re-inserted nor could the operator or driver secure access to the shaft 45 so as to rotate it.

When the handle is moved down to take a closing impression, the ticket is fed outwardly a short distance and the wheels are again aligned so that a printed impression may be made above the opening impression. To this end the shaft 45 on being rotated rotates the mutilated gears 56 and 57 moving the stop 58 away from the stop 140 and rotating the pinion 66 and platen 68, thereby feeding the ticket outwardly a short distance, or the distance between the impressions shown in Figs. 3 and 4. The liner mechanism is operated by the tooth 102 being moved out of the V-shaped cut-away portion 96 onto the arcuate surface 109, thereby elevating the liner lever 107 and aligning the type wheels. The cam 80 comes into engagement with the cam surface 110 while the cam 153 is moved out of engagement with the cam surface 111, thereby rotating the lever 112 and operating the printing mechanism for the closing impression. The cam 122 is rotated into engagement with the nose 123, thereby releasing the locking mechanism for the door. The consecutive counter is not operated for the nose 93 moves the slide 83 down only slightly and thereafter the slide 83 is elevated. The consecutive number of the closing impression is, therefore, identical with the consecutive number of the opening impression. The ticket is now free to be removed from the machine and to be forwarded to the auditing department of the taxing authorities.

While I have constantly stressed the importance of using this in connection with taxing purposes and while I contemplate that this may be one of the chief uses thereof, I do not desire to limit the invention to this use or any other particular use. It is broadly adapted to be used wherever it is desired to maintain a record of the distance travelled in any given interim. I realize that many changes may be made in the specific form of embodiment in which I have shown my invention without departing from the spirit thereof and I, therefore, desire to claim the invention broadly except as I may limit myself in the appended claims.

Having now described my invention, I claim:

1. In a machine, mileage wheels, an impression mechanism therefor, a door for said machine, and means whereby said door after being closed is locked when the impression mechanism is operated and is unlocked when the impression mechanism is again operated.

2. In a machine, mileage wheels, an operating means, impression mechanism, means whereby a card is moved into said machine and an impression made thereon when said operating means is initially actuated, a door, and means whereby said door after being closed is locked when the operating means is initially actuated.

3. In a machine, mileage wheels, an operating means, impression mechanism, means whereby a card is moved into said machine and an impression made thereon when said operating means is initially actuated, a door, means whereby said door after being closed is locked when the operating means is initially actuated, and means whereby said door is unlocked when a second impression has been made.

4. In a machine, mileage wheels, an operating means, impression mechanism, means whereby a card is moved into said machine and an impression made thereon when said operating means is initially actuated, a door, means whereby said door after being closed is locked when the operating means is initially actuated, and means whereby said door is unlocked when the operating means is being actuated in a reverse direction to that of its initial actuation.

5. In a machine, a lever, an impression mechanism operated thereby, a door, means whereby said door after being closed is locked when said lever is initially actuated and means whereby said door is unlocked when said lever is subsequently operated.

6. In a machine, an impression mechanism, a door, a lock therefor, and an operating means to operate said impression mechanism and said lock when said operating means is initially actuated.

7. In a machine, an impression mechanism, a door, a lock therefor, an operating means to operate said impression mechanism and said lock when said operating means is initially actuated, and means to release said lock when the operating means is subsequently operated to take a second impression.

8. In a machine, an impression mechanism, feeding mechanism whereby a card may be fed into impression position relative to said impression mechanism, means whereby said impression mechanism is operated, a door, and means whereby said door after being closed is locked when said impression mechanism has been initially operated so as to render said card inaccessible.

9. In a machine, an impression mechanism, feeding mechanism whereby a card may be fed into impression position relative to said impression mechanism, means whereby said impression mechanism is operated, a door, means whereby said door after being closed is locked when said impression mechanism has been initially operated so as to render said card inaccessible, and means whereby said door is unlocked so as to render said card accessible when the impression mechanism is subsequently operated.

10. In a machine, an impression mechanism, feeding mechanism whereby a card may be fed into impression position relative to said impression mechanism, means whereby said impression mechanism is operated, a door, means whereby said door after being closed is locked when said impression mechanism has been initially operated so as to render said card inaccessible, and means whereby said door is unlocked so as to render said card accessible when the impression mechanism is subsequently operated, the feeding mechanism shifting the position of said card after the first impression has been made and before the second impression is made.

11. In a machine, an operating means, a feeding means whereby a card is drawn into the machine and an impression made thereon when said operating means is initially operated, a door, means whereby said door after being closed is locked so as to render inaccessible the card when the operating means is initially operated, and means whereby said door is unlocked so as to render said card accessible when the operating means is subsequently operated.

JOHN F. OHMER.